Feb. 22, 1949.   H. YATES   2,462,702
BENCH FRAMES FOR SUPPORTING AND ROTATING
LONG CYLINDRICAL VESSELS DURING WELDING
Filed Sept. 27, 1947   2 Sheets-Sheet 1

INVENTOR:
HERBERT YATES
BY: Francis E. Boyer
ATTORNEY

Feb. 22, 1949.  H. YATES  2,462,702
BENCH FRAMES FOR SUPPORTING AND ROTATING
LONG CYLINDRICAL VESSELS DURING WELDING
Filed Sept. 27, 1947  2 Sheets-Sheet 2
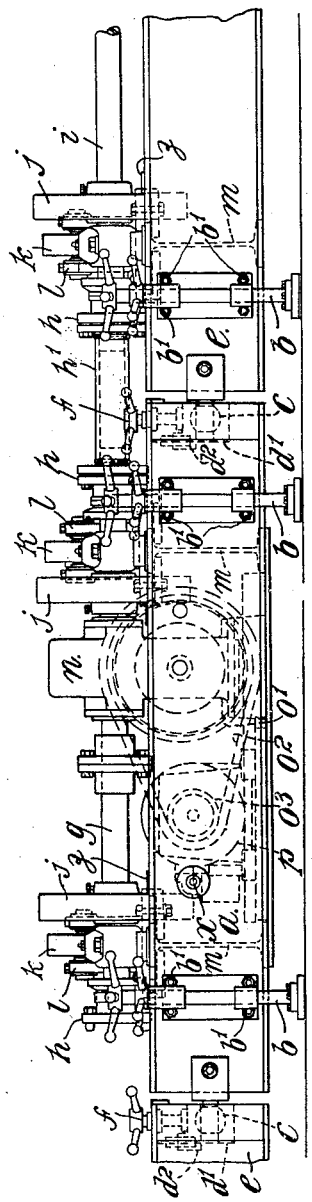
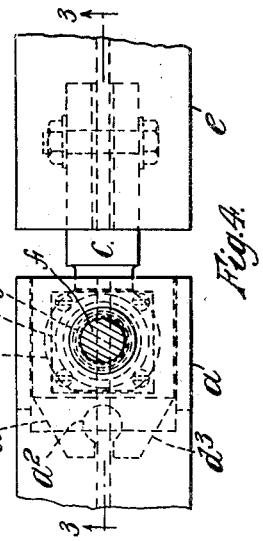
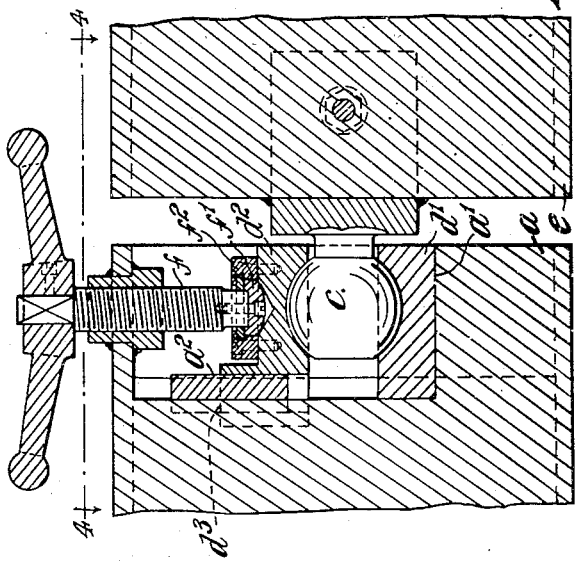
Inventor:
HERBERT YATES
BY: Francis E. Boyer
ATTORNEY Patented Feb. 22, 1949

2,462,702

UNITED STATES PATENT OFFICE 2,462,702

BENCH FRAMES FOR SUPPORTING AND ROTATING LONG CYLINDRICAL VESSELS DURING WELDING

Herbert Yates, Kingsbury, London, England

Application September 27, 1947, Serial No. 776,540
In Great Britain October 16, 1946

9 Claims. (Cl. 214—1)

This invention relates to bench frames for supporting and rotating long cylindrical vessels during welding.

Long cylindrical vessels, such as long cylindrical oil tanks, are transported in sections which are inter-welded at the site of utilisation. The object of the invention is to provide a welding manipulator consisting of a series of frames which can be erected on roughly levelled ground and interconnected, whereon the component sections of a long cylindrical vessel can be supported and rotated with the axis of the vessel horizontal, whilst the component sections are being inter-welded.

For the above purpose, the invention consists of a plurality of bench frames provided with jacks whereby their upper surfaces can be adjusted into and supported in a common horizontal plane, with laterally separated inter-engaging coupling elements at both ends whereby the frames can be intersupportingly interconnected end to end, and shaft couplings, whereby a length of shafting on each can be interconnected, the shafting rotating rollers on which the cylindrical vessel can bear and be rotated, a motor-driven variable speed reduction gearing of large speed range connected to the shafting being mounted on one of the bench frames, and distant control means being provided whereby the motor and gearing can be controlled from any of the bench frames.

Conveniently the motor bench frame occupies an intermediate position in the line of bench frames, and has jacks supporting both ends whereby its upper surface can be rendered horizontal. Successive bench frames need have levelling jacks for supporting only the end remote from the motor frame, as the end nearer the motor frame is supported from an already levelled bench frame by the laterally separated couplings which interconnect the bench frames.

The distant control means is preferably transferable from bench frame to bench frame, and connected, by a cable unwinding from and winding on to a spring wound drum, to the motor bench frame.

The variable gearing is preferably an infinitely variable gear, which, driven by a motor rotating at a speed of many hundred revolutions per minute, for instance 1500 R. P. M., can rotate the cylindrical vessel at speeds varying from a small fraction of a revolution per minute, for instance upwards from $\frac{1}{12}$ R. P. M., to a speed of a few revolutions per minute, for instance downwards from 2½ R. P. M. Such conditions arise in rotating a large cylindrical oil tank or a length of oil pipe with its axis horizontal by friction rollers on the shaft, during welding of its seams. Thus, to rotate the tank or pipe successively through 90° to effect the initial tacking welds at intervals 90° apart along a circumferential seam, the tank or pipe is intermittently rotated at the higher speed, whereas during the actual circumferential welding the tank or pipe is continuously rotated at the lower speed.

A representative example of bench frames according to the invention is shown on the accompanying drawings, in which:

Fig. 2 is a corresponding side elevation.

Fig. 3 is a sectional elevation and

Fig. 4 is a plan on a larger scale of a bench frame coupling.

Figure 1:
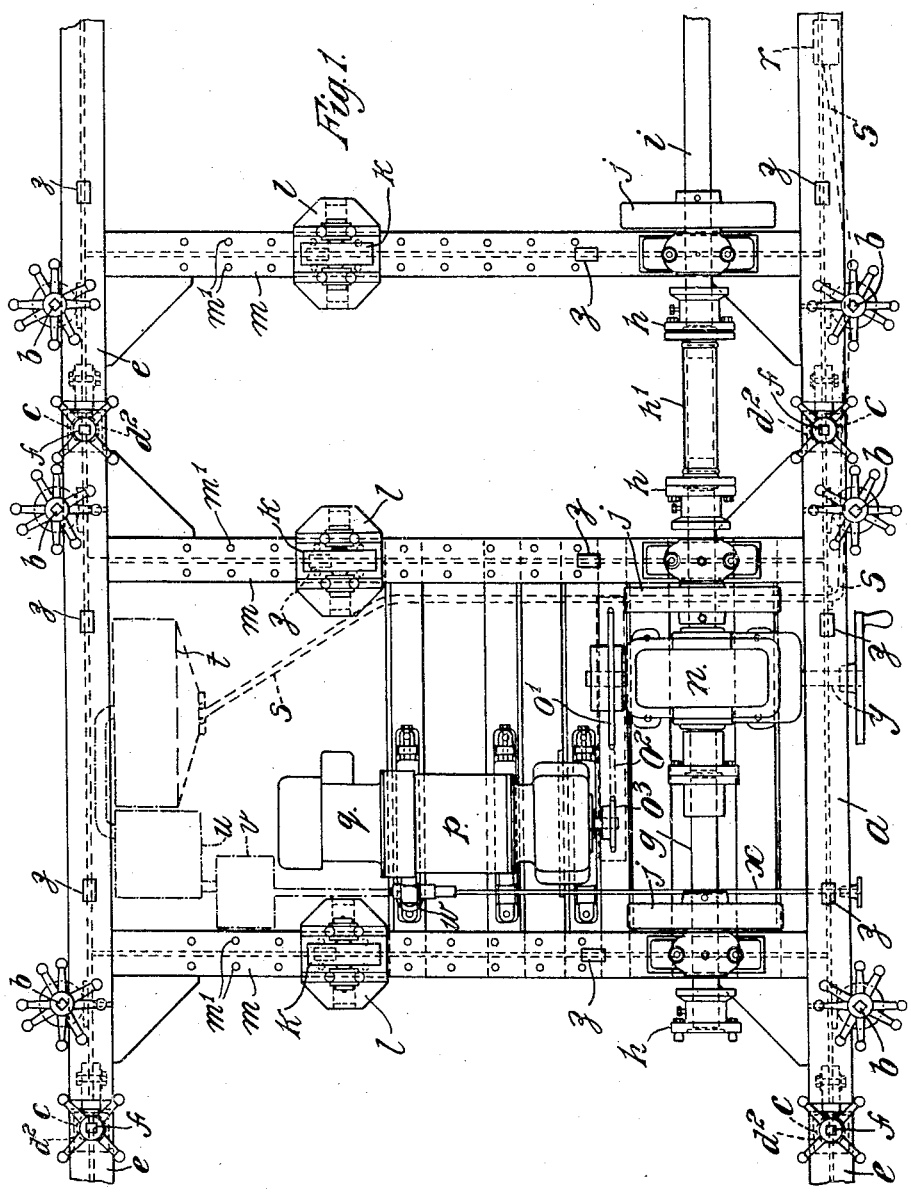
Fig. 1 is a plan of a motor bench frame with the end of a non-motorised bench frame shown connected to each end thereof.

$a$ is a bench frame, rectangular in plan, supported and levelled by handwheel operated screw jacks $b$, one jack at each corner, mounted by bolts $b^1$.

At each corner the bench frame $a$ has an element of a mechanical coupling, either a ball headed stud $c$ or a pair of segmental spherical cups $d^1$, $d^2$, whereby the bench frame $a$ can be coupled to a bench frame $e$, placed at each of its ends in prolongation thereof, by complementary coupling elements $d^1$, $d^2$ or $c$ at the corners of each bench frame $e$.

The pair of segmental cups $d^1$, $d^2$ of each bench coupling is closed and opened by a hand wheel operated screw $f$.

Screw jacks $b$ are shown mounted at both ends of the bench frame $e$. They need however be provided only at the end remote from the bench frame $a$, and can be unbolted and changed from end to end.

$g$ is a line of shafting mounted longitudinally along the top of the bench frame $a$, and terminating at each end thereof in a shaft coupling element $h$ whereby it can be coupled by a floating shaft $h^1$ to the coupling element $h$ of a similar length of shafting $i$, shown on the right hand of Figs. 1 and 2, mounted on each bench frame $e$.

$j$ are friction rollers fast on the shafting $g$, and similar friction rollers $j$ are fast on the shafting $i$, whereon, in conjunction with the idle rollers $k$, likewise also on the bench frames $e$, a long cylindrical tank (not shown) can be supported and rotated.

As mentioned above, the jacks $b$ on the bench frames $e$, if not provided at both ends, can be changed from end to end so as to be at the outer ends of the bench frames which cannot be reversed as the shafting $g$ and $i$ has to be kept in line.

The idle rollers $k$ are mounted on plummer bearing blocks $l$ which can be adjusted laterally across the bench frames along transverse frame girders $m$ and bolted thereto through alternative holes $m^1$, to suit the diameter of the cylindrical tank.

The shafting $g$ is driven through a worm reduction gear $n$, a sprocket and chain reduction gear $o^1$, $o^2$, $o^3$ and an infinitely variable gear $p$ of large speed range, by an electromotor $q$, mounted only on the bench frame $a$.

The starting and stopping of the motor $q$ and the control of the gear $p$ are effected by a distant control box $r$, which can be shifted along the line of bench frames $a$, $e$ and which is connected to the end of a cable $s$, winding on a cable drum $t$. The distant control $r$ operates a control box $u$ which, by a control connection box $v$, is connected to a small motor $w$ which operates the controls of the motor $q$ and gear $p$.

A manual control spindle $x$ also is provided on the bench frame $a$. Also a hand crank shaft $y$ is provided whereby the shafting $g$ can be turned manually through the worm gear $n$.

The constructional details of the distant control means $r$, which is shown diagrammatically, and of the variable gearing $p$ are not shown, as these components are obtainable ready manufactured.

$z$ are levelling pads consisting of plates welded to the upper surface of the bench frames whereon a spirit level can be placed to determine whether such surface is horizontal.

The details of construction of the coupling elements $c$, $d^1$, $d^2$ can be seen in Figs. 3 and 4, which show one end of one of the longitudinal members of the bench frame $a$ and the adjoining end of one of the longitudinal members of a bench frame $e$.

The cup $d^1$ is a block supported, with its segmental spherical recess upwardly directed, on an upwardly directed shoulder $a^1$ presented by an upwardly rebated end of the longitudinal member of the bench frame $a$, to which it is welded.

The cup $d^2$ is a slide block, sliding, with its segmental spherical recess downwardly directed, by means of undercut cheeks $d^3$, on a vertical guide bead $a^2$ on the end of the web of the longitudinal member of the bench frame $a$, above the cup block $d^1$ on the shoulder $a^1$.

The screw $f$ is rotatably connected to the cup block $d^2$, by means of a collar disc $f^1$ and an annular cover plate $f^2$, secured by screws respectively to the screw $f$ and cup block $d^2$.

The stem of the ball headed stud $c$ is welded to the end of the longitudinal member of the bench frame.

Cups $d^1$, $d^2$ are provided at both corners at one end of each bench frame $a$ and $e$, whereas ball headed studs $c$ are provided at both corners at the opposite ends of the bench frames $e$ and $a$.

I claim:

1. A welding manipulator consisting of a plurality of bench frames, jacks on and supporting said bench frames, laterally separated interengaging coupling elements at both ends of said bench frames intersupportingly interconnecting said bench frames end to end, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing operable from any of said bench frames, and further work-supporting rollers on said bench frames transversely separated from said work-supporting rollers rotatable by said shafting.

2. A welding manipulator consisting of a plurality of bench frames, jacks on and supporting said bench frames, laterally separated interengaging coupling elements at both ends of said bench frames intersupportingly interconnecting said bench frames end to end, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing transferable to and operable from any of said bench frames, and further work-supporting rollers on said bench frames transversely separated from said work-supporting rollers rotatable by said shafting.

3. A welding manipulator consisting of a plurality of bench frames, jacks on and supporting said bench frames, laterally separated interengaging coupling elements at both ends of said bench frames intersupportingly interconnecting said bench frames end to end, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing operable from any of said bench frames, and further work-supporting rollers on and transversely displaceable across said bench frames.

4. A welding manipulator consisting of a plurality of bench frames, jacks on and supporting said bench frames, laterally separated interengaging coupling elements at both ends of said bench frames intersupportingly interconnecting said bench frames end to end, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing transferable to and operable from any of said bench frames, and further work-supporting rollers on and transversely displaceable across said bench frames.

5. A welding manipulator consisting of a plurality of bench frames, jacks on and supporting said bench frames, laterally separated interengaging coupling elements at both ends of said bench frames intersupportingly interconnecting said bench frames end to end and consisting of ball-headed studs rigid with one end of each said bench frame, upwardly directed segmental spherical cup blocks rigid with the other end of each said bench frame, downwardly directed segmental spherical cup blocks sliding on said bench frames towards said upwardly directed cup blocks, and screws displacing said sliding cup blocks, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing operable from any of said bench frames, and further work-supporting rollers on said bench frames transversely separated from said work-supporting rollers rotatable by said shafting.

6. A welding manipulator consisting of a plurality of bench frames, jacks on and supporting said bench frames, laterally separated interengaging coupling elements at both ends of said bench frames intersupportingly interconnecting said bench frames end to end and consisting of ball-headed studs rigid with one end of each said bench frame, upwardly directed segmental spherical cup blocks rigid with the other end of each said bench frame, downwardly directed segmental spherical cup blocks sliding on said bench frames towards said upwardly directed cup blocks, and screws displacing said sliding cup blocks, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, a distant control means of said motor and said gearing transferable to and operable from any of said bench frames, and further work-supporting rollers on said bench frames transversely separated from said work-supporting rollers rotatable by said shafting.

7. A welding manipulator consisting of a plurality of bench frames, jacks on and supporting said bench frames, laterally separated interengaging coupling elements at both ends of said bench frames intersupportingly interconnecting said bench frames end to end and consisting of ball-headed studs rigid with one end of each said bench frame, upwardly directed segmental spherical cup blocks rigid with the other end of each said bench frame, downwardly directed segmental spherical cup blocks sliding on said bench frames towards said upwardly directed cup blocks, and screws displacing said sliding cup blocks, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing operable from any of said bench frames, and further work-supporting rollers on and transversely displaceable across said bench frames.

8. A welding manipulator consisting of a plurality of bench frames, jacks on and supporting said bench frames, laterally separated interengaging coupling elements at both ends of said bench frames intersupportingly interconnecting said bench frames end to end and consisting of ball-headed studs rigid with one end of each said bench frame, upwardly directed segmental spherical cup blocks rigid with the other end of each said bench frame, downwardly directed segmental spherical cup blocks sliding on said bench frames towards said upwardly directed cup blocks, and screws displacing said sliding cup blocks, a length of shafting on each bench frame, work-supporting rollers on said bench frames rotatable by said shafting on each bench frame, shaft couplings interconnecting said lengths of shafting, a motor on one of said bench frames, variable speed reduction gearing of large speed range on said motor-provided bench frame and connecting said motor to said length of shafting thereon, distant control means of said motor and said gearing transferable to and operable from any of said bench frames, and further work-supporting rollers on and transversely displaceable across said bench frames.

9. In a welding manipulator consisting of a plurality of bench frames, jacks on and supporting said bench frames and laterally separated interengaging coupling elements at both ends of said bench frames intersupportingly interconnecting said bench frames end to end and consisting of ball-headed studs rigid with one end of each said bench frame, upwardly directed segmental spherical cup blocks rigid with the other end of each said bench frame, downwardly directed segmental spherical cup blocks sliding on said bench frames towards said upwardly directed cup blocks, and screws displacing said sliding cup blocks.

HERBERT YATES.

No references cited.